(12) United States Patent
Li et al.

(10) Patent No.: US 11,099,426 B2
(45) Date of Patent: Aug. 24, 2021

(54) BACKLIGHT MODULE, MANUFACTURING METHOD THEREOF AND DISPLAY DEVICE

(71) Applicant: BOE TECHNOLOGY GROUP CO., LTD., Beijing (CN)

(72) Inventors: Wenbo Li, Beijing (CN); Chunyan Ji, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/494,978

(22) PCT Filed: Mar. 27, 2019

(86) PCT No.: PCT/CN2019/079835
§ 371 (c)(1),
(2) Date: Sep. 17, 2019

(87) PCT Pub. No.: WO2019/218776
PCT Pub. Date: Nov. 21, 2019

(65) Prior Publication Data
US 2020/0379297 A1 Dec. 3, 2020

(30) Foreign Application Priority Data
May 14, 2018 (CN) .......................... 201810454982.X

(51) Int. Cl.
| G02F 1/13357 | (2006.01) |
| G02F 1/1334 | (2006.01) |
| G02F 1/1335 | (2006.01) |

(52) U.S. Cl.
CPC ...... *G02F 1/133605* (2013.01); *G02F 1/1334* (2013.01); *G02F 1/133524* (2013.01); *G02F 1/133606* (2013.01)

(58) Field of Classification Search
None
See application file for complete search history.

(56) References Cited

U.S. PATENT DOCUMENTS

| 2009/0015540 A1* | 1/2009 | Suzuki ............. G02F 1/133615 345/102 |
| 2009/0225022 A1* | 9/2009 | Tolbert ................... H01H 13/83 345/105 |

(Continued)

FOREIGN PATENT DOCUMENTS

| CN | 1472568 A | 2/2004 |
| CN | 101371190 A | 2/2009 |

(Continued)

OTHER PUBLICATIONS

First Office Action for CN Appl. No. 201810454982.X, dated Mar. 16, 2020.

*Primary Examiner* — Ryan Crockett
(74) *Attorney, Agent, or Firm* — The Webb Law Firm

(57) ABSTRACT

The present disclosure discloses a backlight module and a manufacturing method thereof. The backlight module includes: a light guide plate, a reflection structure arranged on one side of the light guide plate and a diffusion structure arranged on the other side of the light guide plate; the reflection structure being switchable between a reflection state that reflects light and a transmission state that transmits light; the diffusion structure being switchable between a scattering state that scatters light and a transmission state that transmits light. The present disclosure also relates to a display device comprising the backlight module.

12 Claims, 4 Drawing Sheets

(56) References Cited

U.S. PATENT DOCUMENTS

| | | | | |
|---|---|---|---|---|
| 2014/0247474 | A1* | 9/2014 | Yamada | C03C 17/40 359/240 |
| 2015/0002783 | A1* | 1/2015 | Park | G02F 1/133615 349/64 |
| 2015/0198856 | A1* | 7/2015 | Lee | G02F 1/1523 359/270 |
| 2018/0364544 | A1* | 12/2018 | Beach | G02F 1/0316 |

FOREIGN PATENT DOCUMENTS

| | | |
|---|---|---|
| CN | 101971278 A | 9/2009 |
| CN | 103775963 A | 5/2014 |
| CN | 103842900 A | 6/2014 |
| CN | 103941458 A | 7/2014 |
| CN | 104252063 A | 12/2014 |
| CN | 105090820 A | 11/2015 |
| CN | 204790254 U | 11/2015 |
| CN | 105116610 A | 12/2015 |
| CN | 105807485 A | 7/2016 |
| CN | 106646987 A | 5/2017 |
| CN | ON 106646987 A * | 5/2017 |
| CN | 108761910 A | 11/2018 |
| WO | WO-2011/158569 A1 | 12/2011 |

\* cited by examiner focal conic texture    planar texture

BACKLIGHT MODULE, MANUFACTURING METHOD THEREOF AND DISPLAY DEVICE

CROSS-REFERENCE TO RELATED APPLICATIONS

The present application is a U.S. National Stage under 35 U.S.C. § 371 of International Application No. PCT/CN2019/079835, as filed on Mar. 27, 2019, which claims priority to Chinese patent application No. 201810454982.X, as filed on May 14, 2018. The disclosure of each of these applications are incorporated herein by reference in entirety.

TECHNICAL FIELD

The present disclosure relates to a backlight module, a manufacturing method thereof and a display device.

BACKGROUND

The technical innovation in the display field is inseparable from the satisfaction of people's various needs of life and the subversive creation of the researchers who never satisfy with the product. Defects in the product itself will prompt researchers to continuously improve the product.

SUMMARY

One or more embodiments of the present disclosure provide a backlight module, comprising: a light guide plate, a reflection structure arranged on one side of the light guide plate and a diffusion structure arranged on the other side of the light guide plate; the reflection structure being switchable between a reflection state that reflects light and a transmission state that transmits light; the diffusion structure being switchable between a scattering state that scatters light and a transmission state that transmits light.

In one or more embodiments according to the present disclosure, the reflection structure includes a first transparent substrate, a first transparent electrode, an electro phase change layer, and a second transparent electrode, which are sequentially overlapped; a voltage applied to the first transparent electrode is positive relative to a voltage applied to the second transparent electrode, so that the electro phase change layer is a reflective layer and the reflection structure is switched to a reflection state; a voltage applied to the first transparent electrode is negative with respect to a voltage applied to the second transparent electrode, so that the electro phase change layer is a transparent layer and the reflection structure is switched to a transmission state.

In one or more embodiments according to the present disclosure, the electro phase change layer includes a metal hydrogen absorption phase change layer, a hydrogen storage layer, and a hydrogen source layer sequentially overlapped on a side of the first transparent electrode facing the second transparent electrode.

In one or more embodiments according to the present disclosure, the material of the metal hydrogen absorption phase change layer includes at least one of the following: a rare earth alloy, a Mg-rare earth alloy, or a Mg-transition alloy.

In one or more embodiments according to the present disclosure, the backlight module further includes a catalytic layer on a side of the hydrogen source layer opposite to the hydrogen storage layer.

In one or more embodiments according to the present disclosure, the material of the metal hydrogen absorption phase change layer is Gd—Mg hydride, the material of the hydrogen storage layer is tungsten trioxide, the material of the hydrogen source layer is zirconium oxide hydrate, and the material of the catalyst layer is palladium metal.

In one or more embodiments according to the present disclosure, the material of the hydrogen storage layer is tungsten trioxide.

In one or more embodiments according to the present disclosure, the material of the hydrogen source layer is zirconium oxide hydrate.

In one or more embodiments according to the present disclosure, a catalytic layer on a side of the hydrogen source layer opposite to the hydrogen storage layer is further included.

In one or more embodiments according to the present disclosure, the material of the catalyst layer is palladium metal.

In one or more embodiments according to the present disclosure, the diffusion structure includes: a second transparent substrate and a third transparent substrate disposed oppositely, a third transparent electrode disposed on a surface of the second transparent substrate facing the third transparent substrate, a fourth transparent electrode disposed on a surface of the third transparent substrate facing the second transparent substrate, and a liquid crystal layer disposed between the third transparent electrode and the fourth transparent electrode; wherein no voltage is applied between the third transparent electrode and the fourth transparent electrode, so that the liquid crystal layer is switched to a scattering state; wherein a preset voltage is applied between the third transparent electrode and the fourth transparent electrode, so that the liquid crystal layer is switched to a transmission state.

In one or more embodiments according to the present disclosure, the liquid crystal layer includes at least one of: polymer dispersed liquid crystal, polymer network liquid crystal or bistable cholesteric liquid crystal.

One or more embodiments of the present disclosure further provide a method for manufacturing the backlight module according to the embodiments of the present disclosure, including:
  forming a reflection structure;
  forming a light guide plate on the reflection structure; and
  forming a diffusion structure on the light guide plate.

In one or more embodiments according to the present disclosure, said forming a reflection structure includes:
  providing a first transparent substrate;
  forming a first transparent electrode on a side of a first transparent substrate;
  forming a metal hydrogen absorption phase change layer on a side of the first transparent electrode opposite to the first transparent substrate;
  forming a hydrogen storage layer on a side of the metal hydrogen absorption phase change layer opposite to the first transparent electrode;
  forming a hydrogen source layer on a side of the hydrogen storage layer opposite to the metal hydrogen absorption phase change layer; and
  forming a second transparent electrode on a side of the hydrogen source layer opposite to the hydrogen storage layer.

In one or more embodiments according to the present disclosure, forming a metal hydrogen absorption phase change layer on a side of the first transparent electrode opposite to the first transparent substrate includes: performing co-sputtering at an atomic ratio of Gd metal to Mg metal of 1:1 in a mixed gas atmosphere of hydrogen and argon.

In one or more embodiments according to the present disclosure, forming a hydrogen storage layer on a side of the metal hydrogen absorption phase change layer opposite to the first transparent electrode includes: depositing WO3 using a W target.

In one or more embodiments according to the present disclosure, forming a hydrogen source layer on a side of the hydrogen storage layer opposite to the metal hydrogen absorption phase change layer includes: depositing zrox using a Zr target.

In one or more embodiments according to the present disclosure, after forming the hydrogen source layer and before forming the second transparent electrode, the method further comprises: forming a catalytic layer on a side of the hydrogen source layer opposite to the hydrogen storage layer.

In one or more embodiments according to the present disclosure, forming a catalytic layer on a side of the hydrogen source layer opposite to the hydrogen storage layer includes: depositing a Pd layer using a Pd target.

One or more embodiments of the present disclosure further provide a display device, including the backlight module described above, wherein the reflection structure is switched to a reflection state and the diffusion structure is switched to a scattering state, so that the display device performs normal display; and the reflection structure is switched to a transmission state and the diffusion structure is switched to a transmission state, so that the display device performs transparent display.

DETAILED DESCRIPTION

In order to make the objects, technical solutions and advantages of the examples of the present disclosure clearer, the technical solutions of the examples of the present disclosure will be described in a clear and complete manner below based on the figures of the embodiments of the present disclosure. Obviously, the examples as described are just a part, instead of all, of the examples of the present disclosure. All other examples that are obtainable to those skilled in the art based on the examples of the present disclosure as described without any creative effort are included in the protection scope of the present disclosure.

Unless otherwise defined, technological terms or scientific terms used in the present disclosure shall have meanings as commonly understood by those ordinary technicians skilled in the field to which the present disclosure pertains. The terms "first", "second" and similar wordings used in the present disclosure do not mean any order, quantity or importance, but are used only to discriminate different constituents. A term such as "comprising" or "including" means the element or subject appearing before said term contain the element or subject appearing after said term and equivalents thereof, without exclusion of other elements or subject. A term such as "connected" or "interconnected" are not limited to a physical or mechanical connection, but may include an electrical connection, either directly or indirectly. Terms such as "up", "down", "left" and "right" are used to show relative positions, and when the absolute position of the object as described changes, the relative position may be changed accordingly.

Detailed descriptions of known functions and known components are omitted from the present disclosure in order to keep the following description of the embodiments of the present disclosure clear and concise.

Figure 1:
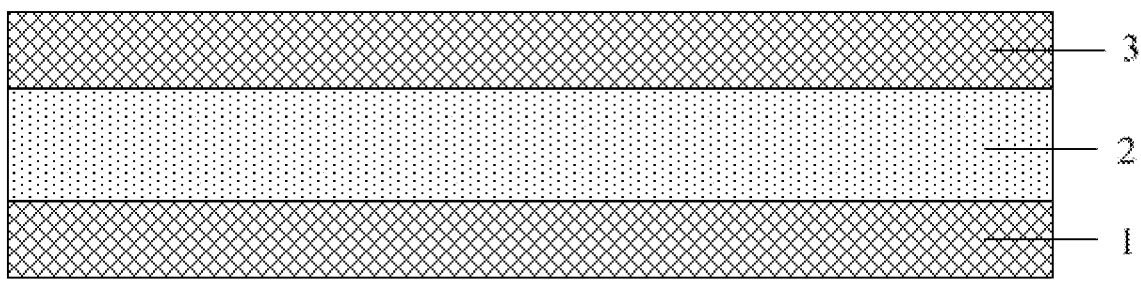
FIG. 1 is a schematic structural diagram of a backlight module according to an embodiment of the present disclosure.

Referring to FIG. 1, an embodiment of the present disclosure provides a backlight module, which includes: a light guide plate 2, a reflection structure 1 arranged on one side of the light guide plate 2, and a diffusion structure 3 arranged on the other side of the light guide plate 2.

The reflection structure 1 is switchable between a reflection state that reflects light and a transmission state that transmits light. Moreover, the diffusion structure 3 is switchable between a scattering state that scatters light and a transmission state that transmits light.

Figure 2:
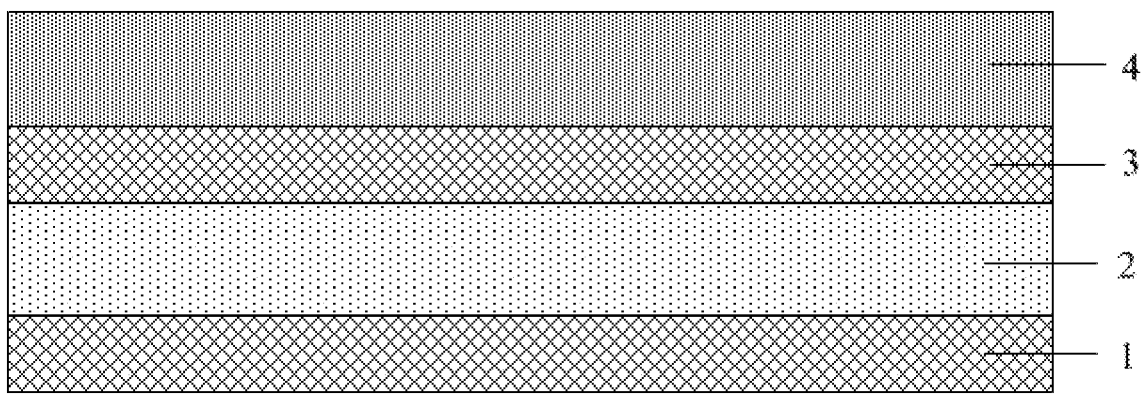
FIG. 2 is a schematic structural diagram of a display device according to an embodiment of the present disclosure.

Referring to FIG. 2, an embodiment of the present disclosure provides a display device, including a backlight module and a liquid crystal cell 4 according to an embodiment of the present disclosure. When the reflection structure 1 is switched to a reflection state and the diffusion structure 3 is switched to a scattering state, the display device performs normal display. Further, when the reflection structure 1 is switched to a transmission state and the diffusion structure 3 is switched to a transmission state, the display device performs transparent display.

The backlight module according to the embodiment of the present disclosure comprises: a light guide plate, a reflection structure arranged on one side of the light guide plate and a diffusion structure arranged on one side of the light guide plate. Through the design of the reflection structure and the diffusion structure, the reflection structure can reflect light when switched to a reflection state, and can transmit light when switched to a transmission state, and the diffusion structure can scatter light when switched to a scattering state, and can transmit light when switched to a transmission state.

When the reflection structure is switched to a reflection state and the diffusion structure is switched to a scattering state, the display device can realize normal display. Further, when the reflection structure is switched to a transmission state and the diffusion structure is switched to a transmission state, the display device can realize transparent display. Whereby the display device can be switched between normal display and transparent display.

Figure 3:
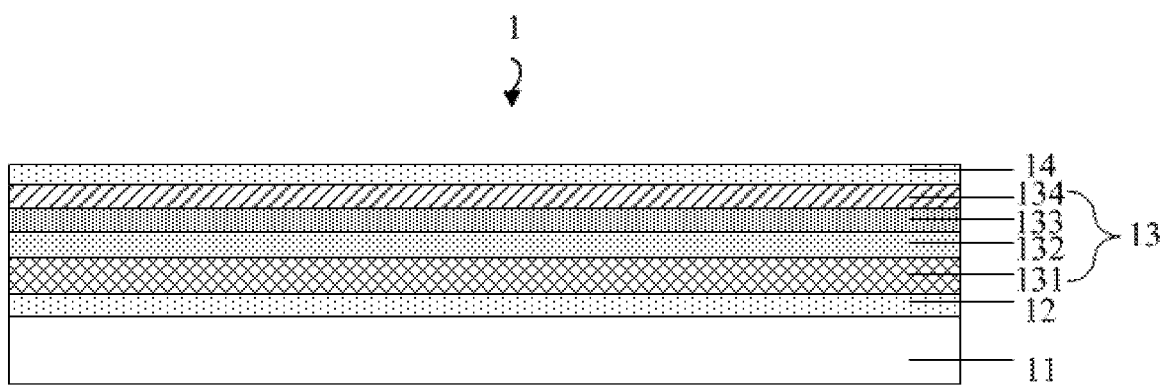
FIG. 3 is a schematic structural diagram of a reflection structure according to an embodiment of the present disclosure.

In the embodiments, referring to FIG. 3, the reflection structure 1 can specifically include: a first transparent substrate 11, a first transparent electrode 12 disposed on the first transparent substrate 11, an electro phase change layer 13 disposed on the first transparent electrode 12, and a second transparent electrode 14 disposed on the electro phase change layer 13. When a voltage applied to the first transparent electrode 12 is positive with respect to a voltage applied to the second transparent electrode 14, the electro phase change layer 13 is switched to a reflection state. Moreover, when a voltage applied to the first transparent electrode 12 is negative with respect to a voltage applied to the second transparent electrode 14, the electro phase change layer 13 is switched to a transmission state.

Specifically, the electro phase change layer 13 can specifically include: a metal hydrogen absorption phase change layer 131 on the first transparent electrode 12, a hydrogen storage layer 132 on the metal hydrogen absorption phase change layer 131, and a hydrogen source layer 134 on the hydrogen storage layer 133. The material of the metal hydrogen absorption phase change layer 131 can specifically include at least one of the following: a rare earth alloy (e.g., Y—La alloy), Mg-rare earth alloy, or Mg-transition alloy. Further, the metal hydrogen absorption phase change layer 131 can be Gd—Mg hydride, the hydrogen storage layer can specifically be tungsten trioxide, and the hydrogen source layer can be an electrolyte, specifically zirconium oxide hydrate. The electro phase change layer 13 can also include a catalytic layer (not shown) located on the hydrogen source layer 134, which act as catalysts to the reactions. The catalytic layer can specifically be Pd.

The conversion principle of the electro phase change layer according to the embodiment of the disclosure is described in detail below by taking the metal hydrogen absorption phase change layer 131 as Gd—Mg hydride, the hydrogen storage layer as tungsten trioxide, and the hydrogen source layer as zirconium oxide hydrate as examples.

When a potential of +2V is applied to the first transparent electrode 131 and a potential of 0V is applied to the second transparent electrode 134, GdMgH5 releases hydrogen ions to the hydrogen storage layer 132 to generate GdMgH2, which is at a metal reflection state, so that the reflection structure 1 is switched to a reflection state. When a potential of −2V is applied to the first transparent electrode 131 and a potential of 0V is applied to the second transparent electrode 134, the GdMgH2 film layer absorbs H ions from the hydrogen storage layer 132 and reacts to generate GdMgH5, which is at a transmission state, so that the reflection structure 1 is switched to a transmission state. Of course, in specific embodiment, the voltage applied to the first transparent electrode and the second transparent electrode can be voltage values other than positive or negative 2V. For example, a potential of 0V can be applied to the second transparent electrode 134 while a potential of −1V is applied to the first transparent electrode 131, or a potential of 0V can be applied to the second transparent electrode 134 while a potential of +1V is applied to the first transparent electrode 131. Alternatively, the voltages applied to the first transparent electrode 131 and the second transparent electrode 134 can be other voltage values between −2V to −1V and +1V to +2V, as long as the voltages applied to the first transparent electrode 12 is set to a positive potential with respect to the voltage applied to the second transparent electrode 14 when the reflection structure 1 needs to achieve a reflection state, and the voltages applied to the first transparent electrode 12 is set to a negative potential with respect to the voltage applied to the second transparent electrode 14 when a transmission state needs to be achieved, which are within the scope of the present disclosure. The voltage applied to the first transparent electrode 131 and the second transparent electrode 134 can be between 1V and 2V. Of course, the specific voltage value can also vary according to the material of the film layer, and the present disclosure is not limited thereto.

In specific embodiment, the reflection structure 1 can be other structures capable of switching between a reflection state and a transmission state, and the present disclosure is not limited thereto.

Figure 4:
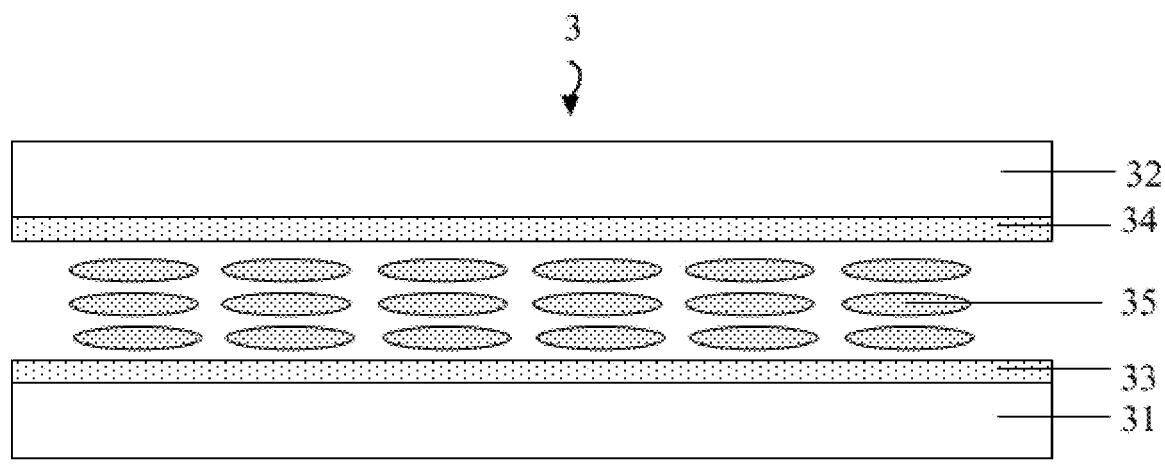
FIG. 4 is a schematic structural diagram of a diffusion structure according to an embodiment of the present disclosure.
Figure 5:
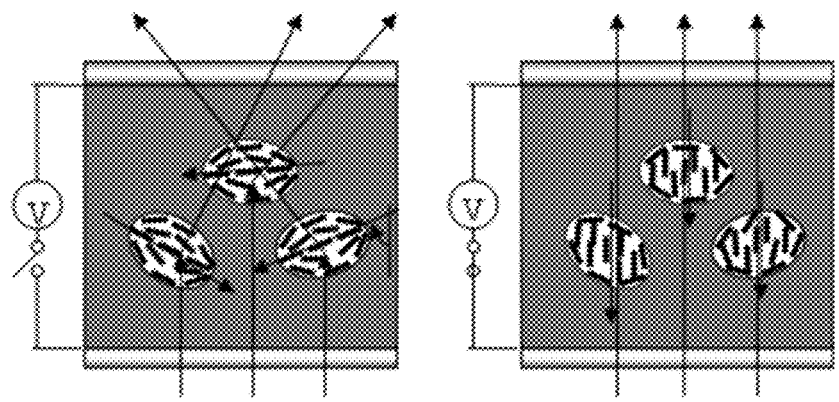
FIG. 5 is a schematic structural diagram of a liquid crystal layer deflection according to an embodiment of the present disclosure.
Figure 6:
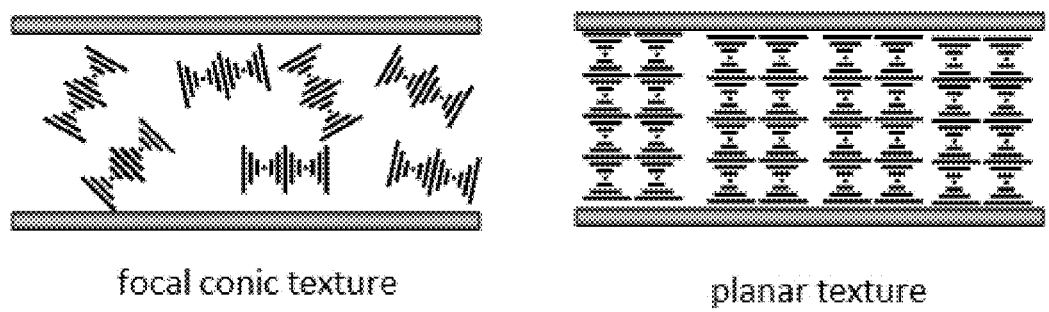
FIG. 6 is a schematic structural diagram of another liquid crystal layer deflection according to an embodiment of the present disclosure.

In specific embodiment, as shown in FIG. 4, the diffusion structure 3 includes: a second transparent substrate 31 and a third transparent substrate 32 which are oppositely arranged, a third transparent electrode 33 arranged on a surface of the second transparent substrate 31 facing the third transparent substrate 32, a fourth transparent electrode 34 arranged on a surface of the third transparent substrate 32 facing the second transparent substrate 31, and a liquid crystal layer 35 arranged between the third transparent electrode 33 and the fourth transparent electrode 34. When no voltage is applied between the third transparent electrode 33 and the fourth transparent electrode 34, the liquid crystal layer 35 is switched to a scattering state. Further, when a preset voltage is applied between the third transparent electrode 33 and the fourth transparent electrode 34, the liquid crystal layer 35 is switched to a transmission state. The liquid crystal layer 35 can specifically include at least one of: polymer dispersed liquid crystal (PDLC), polymer network liquid crystal (PNLC), or bistable cholesteric liquid crystal. The formal PDLC is in a scattering state under normal conditions, and is in a transparent state after an electric field is applied. When a refractive index of the polymer and an effective refractive index of the liquid crystal are matched, a transparent state is exhibited, as shown in the left side of FIG. 5; otherwise, it is in a scattering state, as shown in the right side of FIG. 5. As shown in FIG. 6, when the bistable cholesteric liquid crystal structure has a focal conic texture in which liquid crystal molecules are randomly arranged, the display device is in a scattering state, and when it has a planar texture in which liquid crystal molecules are horizontally arranged, the display device is in a transparent state.

Figure 7:
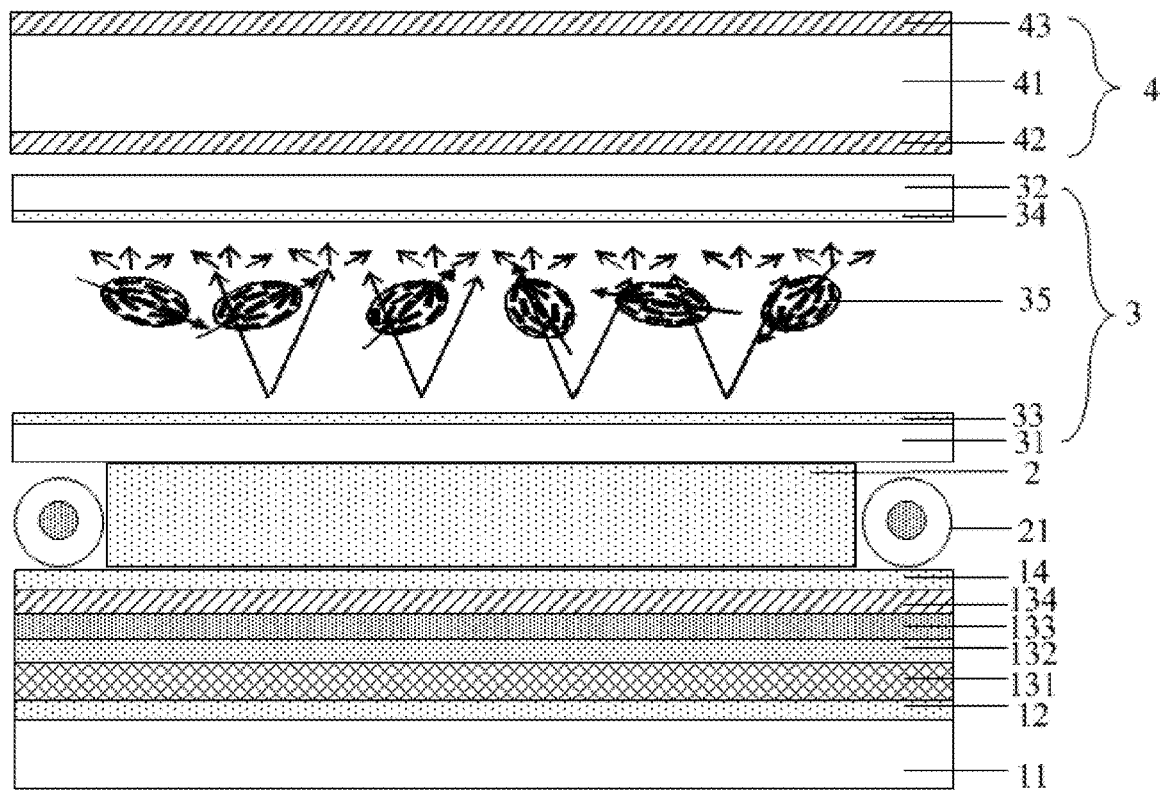
FIG. 7 is a schematic structural diagram of a display device during normal display according to an embodiment of the disclosure.
Figure 8:
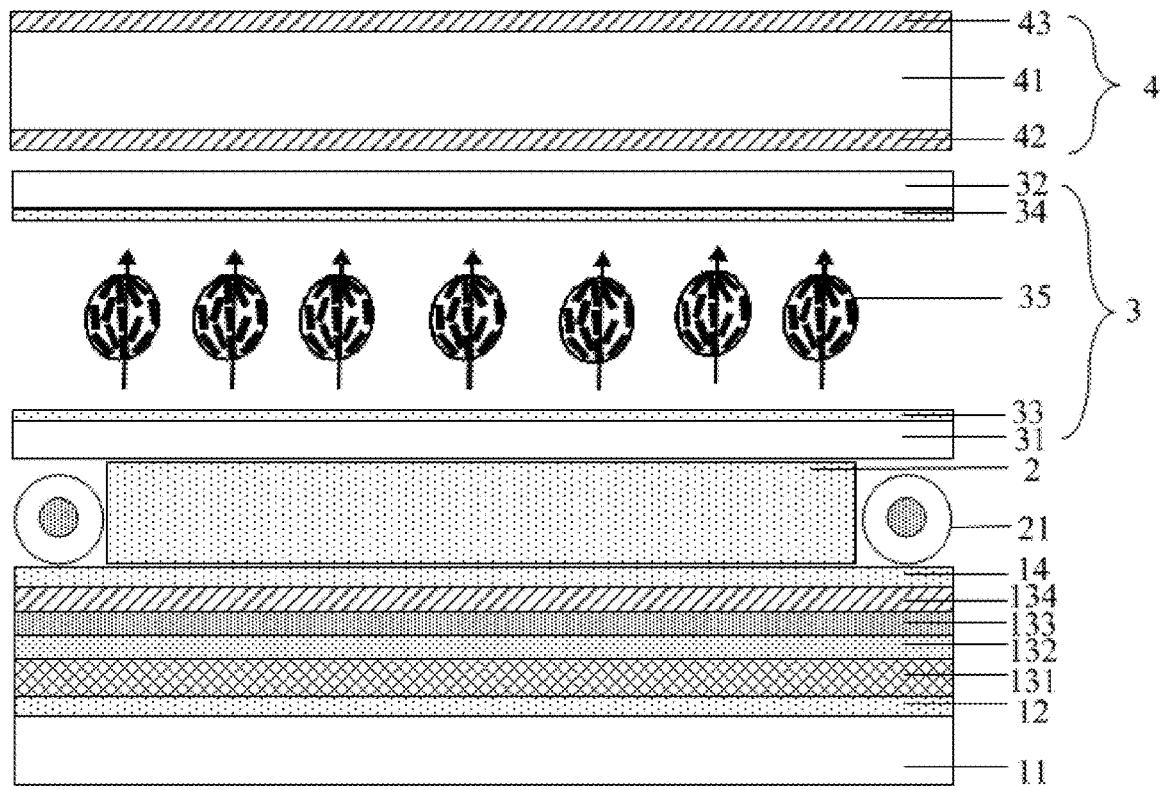
FIG. 8 is a schematic structural diagram of a display device during transparent display according to an embodiment of the disclosure.

The following describes a switching process of the display device according to the embodiment of the present disclosure with reference to FIGS. 7 and 8, taking the liquid crystal layer 35 as a polymer dispersed liquid crystal as an example.

When the display device needs to perform normal display, referring to FIG. 7, a voltage of +2V is applied to the first transparent electrode 12, a voltage of 0V is applied to the second transparent electrode 14, that is, the voltage applied to the first transparent electrode 12 is positive with respect to the voltage applied to the second transparent electrode 14. Then, GdMgH5 (that is, the metal hydrogen absorption phase change layer 131) releases hydrogen ions to the hydrogen storage layer 132 to generate GdMgH2, which has a metal reflection state, and the reflection structure 1 reflects light. Meanwhile, no voltage is applied between the third transparent electrode 33 and the fourth transparent electrode 34, the liquid crystal layer 35 scatters light, and the display device displays normally. The display device can further include a light source structure 21 disposed on the light incident side of the light guide plate.

When the display device needs to perform transparent display, referring to FIG. 8, a voltage of −2V is applied to the first transparent electrode 12, a voltage of 0V is applied to the second transparent electrode 14, that is, the voltage applied to the first transparent electrode 12 is negative with respect to the voltage applied to the second transparent electrode 14. Then, GdMgH2 (that is, the metal hydrogen absorption phase change layer 131) absorbs hydrogen ions to generate GdMgH5, which has a transmission state, and the reflection structure 1 transmits light. Meanwhile, a preset voltage is applied between the third transparent electrode 33 and the fourth transparent electrode 34, the liquid crystal layer 35 transmits light, and the display device achieves transparent display.

In the examples shown in FIGS. 7 and 8, the liquid crystal cell 4 includes a liquid crystal layer 41, a first polarizer 42, and a second polarizer 43. The liquid crystal cell 4 can also have other structures known to those skilled in the art.

Figure 9:
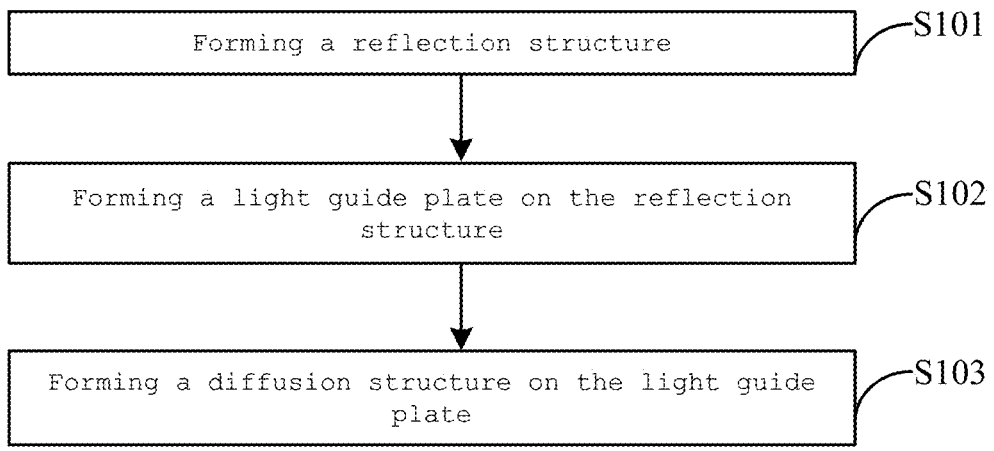
FIG. 9 is a schematic diagram of a manufacturing process of a display device according to an embodiment of the disclosure.

Based on the same concept, an embodiment of the present disclosure further provides a manufacturing method for manufacturing the backlight module according to an embodiment of the present disclosure, as shown in FIG. 9, the manufacturing method includes the following steps.

Step S101, forming a reflection structure.

Step 102, forming a light guide plate on the reflection structure.

Step S103, forming a diffusion structure on the light guide plate.

Figure 10:
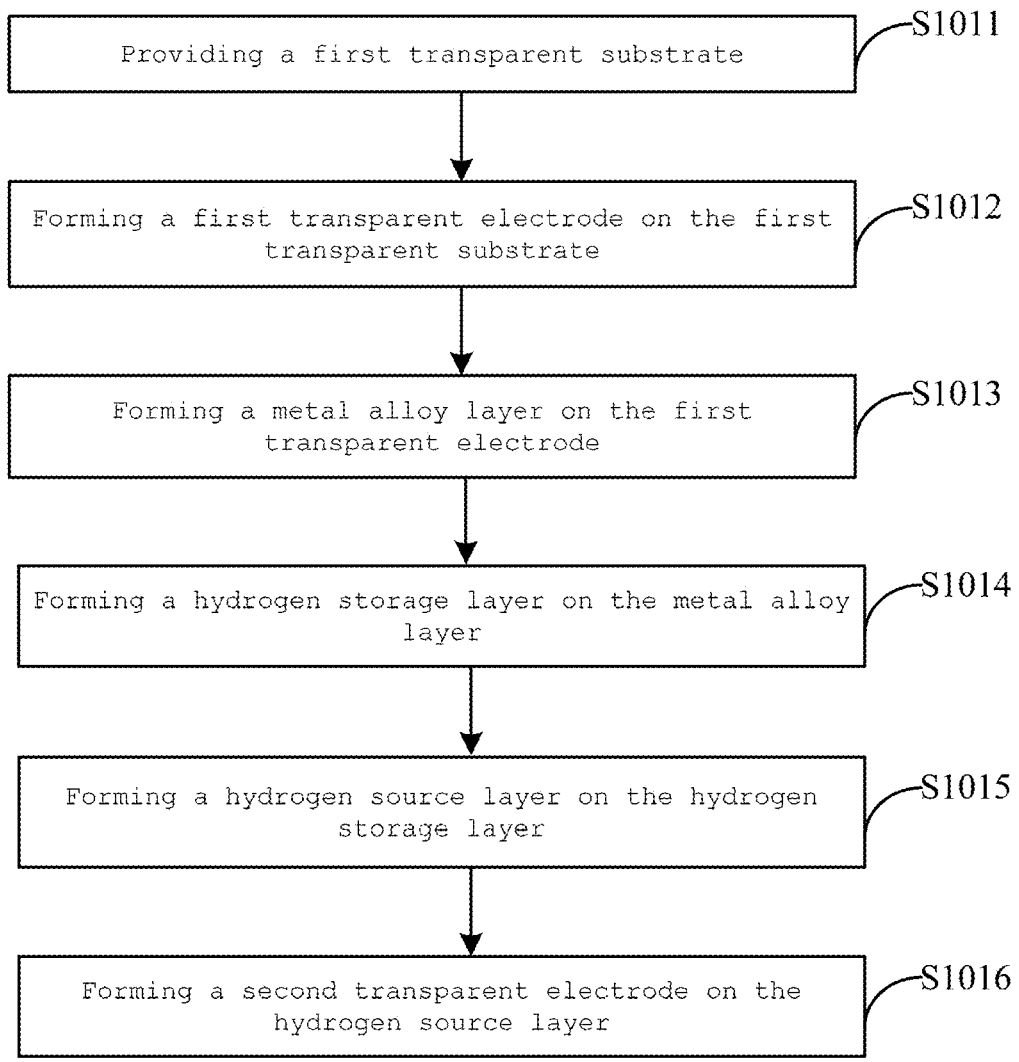
FIG. 10 is a schematic diagram of a manufacturing process of a reflection structure according to an embodiment of the present disclosure.

In specific embodiment, step S101, namely, forming a reflective structure, as shown in FIG. 10, includes the following steps.

Step S1011, providing a first transparent substrate.

Step S1012, forming a first transparent electrode on the first transparent substrate.

Step S1013, forming a metal hydrogen absorption phase change layer on the first transparent electrode.

In the embodiment, the step S1013, namely, forming a metal hydrogen absorption phase change layer on the first transparent electrode, can specifically include: forming GdMgH5 on an ITO glass by a 1:1 atomic ratio co-sputtering under a vacuum of $10^{-1}$ Pa under an $H_2/Ar$ atmosphere.

Step S1014, forming a hydrogen storage layer on the metal hydrogen absorption phase change layer. Specifically, WO3 can be deposited using a W target.

Step S1015, forming a hydrogen source layer on the hydrogen storage layer. Specifically, ZrO2Hx can be deposited using a Zr target.

Step S1016, forming a second transparent electrode on the hydrogen source layer. Specifically, an In\Sn alloy target can be used for depositing the ITO film layer.

Between step S1015 and step 1016, a catalytic layer can also be formed on the hydrogen source layer. Specifically, a Pd layer can be deposited on the hydrogen source layer using a Pd target.

The embodiment of the present disclosure has the following beneficial effects. The backlight module according to the embodiment of the present disclosure comprises: a light guide plate, a reflection structure arranged on one side of the light guide plate and a diffusion structure arranged on the other side of the light guide plate; wherein, by designing the reflection structure and the diffusion structure, the reflection structure is switchable between a reflection state that reflects light and a transmission state that transmits light, and the diffusion structure is switchable between a scattering state that scatters light and a transmission state that transmits light. For a display device having such a backlight module, when the reflection structure is switched to a reflection state and the diffusion structure is switched to a scattering state, the display device can realize normal display; when the reflection structure is switched to a transmission state and the diffusion structure is switched to a transmission state, the display device can realize transparent display, whereby the display device can be switched between normal display and transparent display.

It will be apparent to those skilled in the art that various modifications and variations can be made to the examples of the present disclosure without departing from the spirits and scope of the present disclosure. In this case, if the modifications and variations made to the present disclosure fall within the scope of the claims of the present disclosure and equivalents thereof, the present disclosure is intended to include these modifications and variations.

What is claimed is:

1. A backlight module, comprising: a light guide plate, a reflection structure arranged on one side of the light guide plate, and a diffusion structure arranged on other side of the light guide plate,
   wherein the reflection structure is switchable between a reflection state that reflects light and a transmission state that transmits light, and the diffusion structure is switchable between a scattering state that scatters light and a transmission state that transmits light,
   wherein, when the reflection structure is switched to the reflection state, the diffusion structure is switched to the scattering state; and
   wherein, when the reflection structure is switched to the transmission state, the diffusion structure is switched to the transmission state,
   the reflection structure includes a first transparent substrate, a first transparent electrode, an electro phase change layer, and a second transparent electrode, which are sequentially overlapped;
   a voltage applied to the first transparent electrode is positive relative to a voltage applied to the second transparent electrode, so that the electro phase change layer is a reflective layer and the reflection structure is switched to a reflection state; a voltage applied to the first transparent electrode is negative with respect to a voltage applied to the second transparent electrode, so that the electro phase change layer is a transparent layer and the reflection structure is switched to a transmission state,
   wherein the electro phase change layer includes a metal hydrogen absorption phase change layer, a hydrogen storage layer, and a hydrogen source layer sequentially overlapped on a side of the first transparent electrode facing the second transparent electrode,
   the metal hydrogen absorption phase change layer releases hydrogen ions to the hydrogen storage layer to switch to the reflection state, and the metal hydrogen absorption phase change layer absorbs hydrogen ions from the hydrogen storage layer to switch to the transmission state,
   a material of the hydrogen storage layer is tungsten trioxide, and
   a material of the hydrogen source layer is hydrous zirconium oxide.

2. The backlight module of claim 1, wherein, a material of the metal hydrogen absorption phase change layer comprises at least one of the following: a rare earth alloy, a Mg-rare earth alloy, or a Mg-transition alloy.

3. The backlight module of claim 2, wherein, a material of the metal hydrogen absorption phase change layer is Gd—Mg hydride.

4. The backlight module of claim 1, further comprising a catalytic layer on a side of the hydrogen source layer opposite to the hydrogen storage layer.

5. The backlight module of claim 4, wherein, a material of the catalytic layer is palladium metal.

6. The backlight module of claim 1, wherein,
the diffusion structure includes: a second transparent substrate and a third transparent substrate disposed oppositely, a third transparent electrode disposed on a surface of the second transparent substrate facing the third transparent substrate, a fourth transparent electrode disposed on a surface of the third transparent substrate facing the second transparent substrate, and a liquid crystal layer disposed between the third transparent electrode and the fourth transparent electrode;
no voltage is applied between the third transparent electrode and the fourth transparent electrode, so that the liquid crystal layer is switched to a scattering state; a preset voltage is applied between the third transparent electrode and the fourth transparent electrode, so that the liquid crystal layer is switched to a transmission state.

7. The backlight module of claim 6, wherein the liquid crystal layer includes at least one of: polymer dispersed liquid crystal, polymer network liquid crystal or bistable cholesteric liquid crystal.

8. A method for manufacturing a backlight module, comprising:
forming a reflection structure;
forming a light guide plate on the reflection structure; and
forming a diffusion structure on the light guide plate,
wherein the reflection structure is switchable between a reflection state that reflects light and a transmission state that transmits light, and the diffusion structure is switchable between a scattering state that scatters light and a transmission state that transmits light,
wherein, when the reflection structure is switched to the reflection state, the diffusion structure is switched to the scattering state; and
wherein, when the reflection structure is switched to the transmission state, the diffusion structure is switched to the transmission state,
wherein said forming the reflection structure comprises:
providing a first transparent substrate;
forming a first transparent electrode on a side of a first transparent substrate;
forming a metal hydrogen absorption phase change layer on a side of the first transparent electrode opposite to the first transparent substrate;
depositing $WO_3$ using a W target so as to form a hydrogen storage layer on a side of the metal hydrogen absorption phase change layer opposite to the first transparent electrode;
depositing $ZrO_2H_x$ using a Zr target so as to form a hydrogen source layer on a side of the hydrogen storage layer opposite to the metal hydrogen absorption phase change layer; and
forming a second transparent electrode on a side of the hydrogen source layer opposite to the hydrogen storage layer,
wherein the metal hydrogen absorption phase change layer releases hydrogen ions to the hydrogen storage layer to switch to the reflection state, and the metal hydrogen absorption phase change layer absorbs hydrogen ions from the hydrogen storage layer to switch to the transmission state.

9. The manufacturing method of claim 8, wherein forming a metal hydrogen absorption phase change layer on a side of the first transparent electrode opposite to the first transparent substrate comprises:
performing co-sputtering at an atomic ratio of Gd metal to Mg metal being 1:1 in a mixed gas atmosphere of hydrogen and argon.

10. The manufacturing method of claim 8, further comprising, after forming the hydrogen source layer and before forming the second transparent electrode:
forming a catalytic layer on a side of the hydrogen source layer opposite to the hydrogen storage layer.

11. The manufacturing method of claim 10, wherein, forming a catalytic layer on a side of the hydrogen source layer opposite to the hydrogen storage layer comprises:
depositing a Pd layer using a Pd target.

12. A display device, comprising a backlight module, the backlight module comprises a light guide plate, a reflection structure arranged on one side of the light guide plate, and a diffusion structure arranged on other side of the light guide plate,
wherein the reflection structure is switchable between a reflection state that reflects light and a transmission state that transmits light, and the diffusion structure is switchable between a scattering state that scatters light and a transmission state that transmits light,
wherein, the reflection structure is switched to a reflection state and the diffusion structure is switched to a scattering state, so that the display device performs normal display; and
the reflection structure is switched to a transmission state and the diffusion structure is switched to a transmission state, so that the display device performs transparent display,
the reflection structure includes a first transparent substrate, a first transparent electrode, an electro phase change layer, and a second transparent electrode, which are sequentially overlapped;
a voltage applied to the first transparent electrode is positive relative to a voltage applied to the second transparent electrode, so that the electro phase change layer is a reflective layer and the reflection structure is switched to a reflection state; a voltage applied to the first transparent electrode is negative with respect to a voltage applied to the second transparent electrode, so that the electro phase change layer is a transparent layer and the reflection structure is switched to a transmission state,
wherein the electro phase change layer includes a metal hydrogen absorption phase change layer, a hydrogen storage layer, and a hydrogen source layer sequentially overlapped on a side of the first transparent electrode facing the second transparent electrode,
the metal hydrogen absorption phase change layer releases hydrogen ions to the hydrogen storage layer to switch to the reflection state, and the metal hydrogen absorption phase change layer absorbs hydrogen ions from the hydrogen storage layer to switch to the transmission state,
a material of the hydrogen storage layer is tungsten trioxide, and
a material of the hydrogen source layer is hydrous zirconium oxide.

* * * * *